(12) United States Patent
Pittman et al.

(10) Patent No.: US 10,380,423 B2
(45) Date of Patent: Aug. 13, 2019

(54) UTILITY INFRASTRUCTURE MAPPING

(71) Applicant: Pilot Fiber Inc., New York, NY (US)

(72) Inventors: Kyle Pittman, Durham, NC (US); Dongjin Kim, Chapel Hill, NC (US)

(73) Assignee: Pilot Fiber Inc., New York, NY (US)

( * ) Notice: Subject to any disclaimer, the term of this patent is extended or adjusted under 35 U.S.C. 154(b) by 0 days.

(21) Appl. No.: 15/798,967

(22) Filed: Oct. 31, 2017

(65) Prior Publication Data
US 2019/0130181 A1    May 2, 2019

(51) Int. Cl.
 *G06K 9/00* (2006.01)
 *G06K 9/46* (2006.01)
 *G06K 9/32* (2006.01)

(52) U.S. Cl.
 CPC ....... *G06K 9/00637* (2013.01); *G06K 9/3233* (2013.01); *G06K 9/4604* (2013.01)

(58) Field of Classification Search
 None
 See application file for complete search history.

(56) References Cited

U.S. PATENT DOCUMENTS

| | | | | |
|---|---|---|---|---|
| 8,818,031 | B1* | 8/2014 | Kelly | G06K 9/00671 382/103 |
| 2015/0243054 | A1* | 8/2015 | Nielsen | G06K 9/0063 345/589 |
| 2016/0328869 | A1* | 11/2016 | Nielsen | G06K 9/0063 |
| 2017/0061227 | A1* | 3/2017 | Sharma | G06K 9/3241 |

OTHER PUBLICATIONS

Mishkin et al. "Systematic evaluation of CNN advances on the ImageNet" *Computer Vision and Image Understanding*, p. 1-21 (2016).

* cited by examiner

*Primary Examiner* — Delomia L Gilliard
(74) *Attorney, Agent, or Firm* — Myers Bigel, P.A.

(57) ABSTRACT

A method for identifying utility structures is described. The method includes identifying a geographical area for locating the utility structures, receiving images of the geographical area that was identified, performing image processing on the images that were received, identifying the utility structures based on the image processing, and providing location information associated with the utility structures that were identified. Related devices and computer program products are also described.

16 Claims, 14 Drawing Sheets

⊠ HIGH-PROBABILITY CORRIDOR   ◧ LOW-PROBABILITY CORRIDOR
☰ MID-PROBABILITY CORRIDOR

⊠ HIGH-PROBABILITY CORRIDOR   ◧ LOW-PROBABILITY CORRIDOR
☰ MID-PROBABILITY CORRIDOR

ASSOCIATING THE UTILITY LINE CORRIDOR WITH A PATHWAY IN THE GEOGRAPHICAL AREA. ─ 1210
FIG. 12
PROVIDING A MAP OF THE GEOGRAPHICAL AREA INDICATING PATHWAY AND THE UTILITY LINE CORRIDOR ─ 1310
FIG. 13
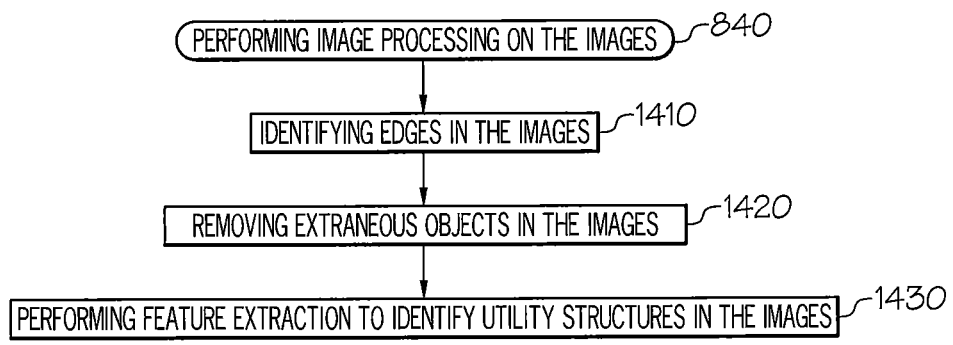
FIG. 14
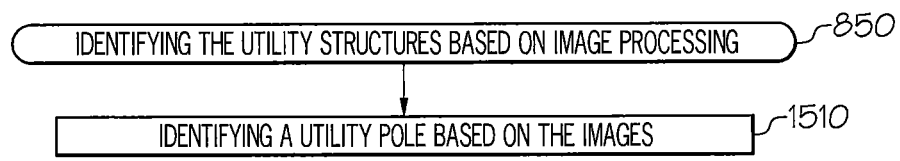
FIG. 15

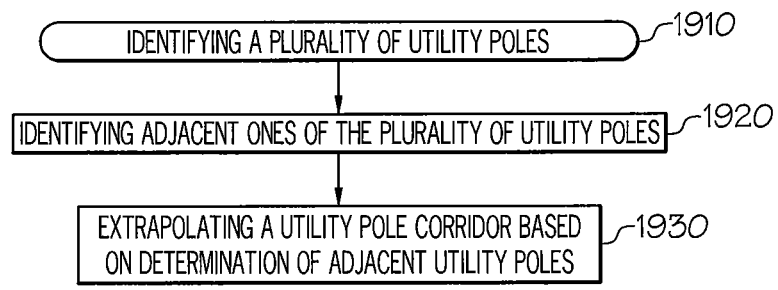
FIG. 19
ASSOCIATING THE UTILITY POLE CORRIDOR WITH A PATHWAY IN THE GEOGRAPHICAL AREA ╱─2010
FIG. 20
PROVIDING A MAP COMPRISING INDICATING THE PATHWAY AND THE UTILITY POLE CORRIDOR THAT IS ASSOCIATED WITH THE PATHWAY ╱─2110
FIG. 21
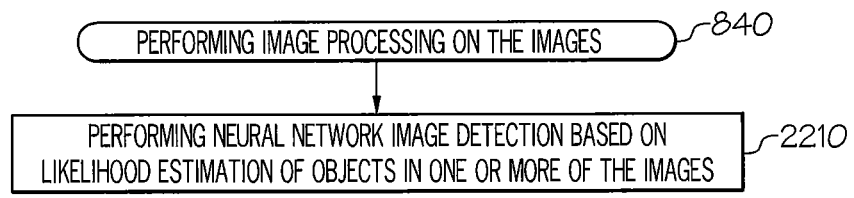
FIG. 22

UTILITY INFRASTRUCTURE MAPPING

FIELD

Various embodiments described herein relate to methods, devices, and computer program products for utilities, and more particularly to utility infrastructure.

BACKGROUND

Utility companies maintain infrastructure for services such as electricity, natural gas, water, telephone, and transportation. The utility infrastructure may include various utility structures, such as streetlight poles, distribution poles, power lines, telecommunications junctions, etc. These utility structures are ubiquitous in civilized areas around the world. Global growth in population has led to greater telecommunications needs. This burgeoning growth in telecommunications and other services has provided incentives to use the existing infrastructure for adding, enhancing, and/or improving networks. Utility companies may need to obtain and/or maintain comprehensive information related to the infrastructure to facilitate growth of services.

SUMMARY

Various embodiments of the present invention are directed to a method for identifying utility structures. The method includes identifying a geographical area for locating the utility structures, receiving images of the geographical area that was identified, performing image processing on the images that were received, identifying the utility structures based on the image processing, and providing location information associated with the utility structures that were identified.

In some embodiments, identifying the geographical area may include identifying one or more pathways that are candidate pathways for a utility corridor, determining a respective location and/or a respective direction of respective ones of the images that are associated with the candidate pathways, and sending a request for the images of the geographical area comprising the respective location and/or the respective direction of respective ones of the images that are associated with the candidate pathways.

In some embodiments, performing image processing on the images that were received may include generating cropped images based on cropping one or more of the images to include portions likely to include utility structures, identifying edges in the cropped images, removing extraneous objects in the cropped images, and performing feature extraction on the cropped images to determine extracted images.

In some embodiments, identifying the utility structures based on the image processing may include identifying utility line segments based on the images, identifying adjacent ones of the utility line segments, and extrapolating a utility line corridor based on two or more of the adjacent ones of the utility segments. The method may include associating the utility line corridor with a pathway in the geographical area. The method may include providing a map comprising at least the geographical area, such that the map indicates the pathway and the utility line corridor that is associated with the pathway.

In some embodiments, performing image processing on the images that were received may include identifying edges in the images, removing extraneous objects in the images, and performing feature extraction to identify utility structures in the images. Identifying the utility structures based on the image processing may include identifying a utility pole based on one or more of the images.

In some embodiments, identifying the utility pole based on one or more of the images may include identifying a vertical structure in the one or more images, and estimating a location of the utility pole based on the vertical structure that was identified.

In some embodiments, estimating the location of the utility pole may include determining a utility pole type based on the vertical structure, determining a width of the utility pole based on the utility pole type, estimating a distance from a camera that captured at least one of the one or more images based on the width of the utility pole, and estimating a utility pole location based on the distance that was estimated. The method may include providing a map comprising at least the geographical area, such that the map indicates a geographical location of the utility pole. The utility pole may be a first utility pole. The method may include identifying a plurality of utility poles comprising the first utility pole based on the one or more images, identifying adjacent ones of the plurality of utility poles, and extrapolating a utility pole corridor based on two or more of the adjacent ones of the utility plurality of utility poles.

In some embodiments, the method may include associating the utility pole corridor with a pathway in the geographical area. The method may include providing a map including at least the geographical area, such that the map indicates the pathway and the utility pole corridor that is associated with the pathway. In some embodiments, performing image processing on the images that were received includes performing neural network image detection based on likelihood estimation of objects in one or more of the images.

Various embodiments described herein can provide a computer program product, including a tangible computer readable storage medium with computer readable program code embodied in the medium that when executed by a processor causes the processor to perform operations including identifying a geographical area for locating the utility structures, receiving images of the geographical area that was identified, performing image processing on the images that were received, identifying the utility structures based on the image processing, and providing location information associated with the utility structures that were identified.

Various embodiments described herein can provide a node in a communication network, the node including a memory configured to store computer executable instructions, and a processor coupled to the memory. The processor is configured to execute the computer executable instructions to perform operations including identifying a geographical area for locating the utility structures, receiving images of the geographical area that was identified, performing image processing on the images that were received, identifying the utility structures based on the image processing, and providing location information associated with the utility structures that were identified.

It is noted that aspects of the inventive concepts described with respect to one embodiment, may be incorporated in a different embodiment although not specifically described relative thereto. That is, all embodiments and/or features of any embodiment can be combined in any way and/or combination. Other operations according to any of the embodiments described herein may also be performed. These and other aspects of the inventive concepts are described in detail in the specification set forth below.

BRIEF DESCRIPTION OF THE DRAWINGS

FIGS. 8 to 22 are flowcharts of operations for identifying utility structures, according to various embodiments described herein.

DETAILED DESCRIPTION

Various embodiments will be described more fully hereinafter with reference to the accompanying drawings. Other embodiments may take many different forms and should not be construed as limited to the embodiments set forth herein. Like numbers refer to like elements throughout.

Utility companies and service providers have infrastructure for services, such as electricity, natural gas, water, telephone, and transportation. The utility infrastructure may belong to one or more different utilities or companies. These various utility structures, such as streetlight poles, distribution poles, power lines, telecommunications junctions, etc., in a geographical area or along a road and/or pathway may indicate the location of an easement or placement rights within a given right-of-way. Mapping of above-ground power distribution corridors, distribution poles and streetlights may provide knowledge of above-ground distribution corridors to determine if a given utility company has easement and pole placement rights within a given right-of-way.

In addition to the poles and corridors themselves, substation data and/or owned-parcel information may be provided to clarify where other necessary equipment needed by the wireless operator could be placed under agreement with the utility. Pole heights as well as streetlight types may also be provided. The output data may be delivered in a variety of formats, including Environmental Systems Research Institute (ESRI) Shapefile, Google Earth Keyhole Markup Language (KML), or Structure Query Language (SQL) database exports for inclusion into a customer's existing mapping systems. The data may also be accessed across an internet-based and/or an intranet-based network via a mapping portal.

Various embodiments described herein may arise from the recognition that knowledge of above ground utility structures and/or distribution corridors are important to utility companies and/or other service providers to determine easement and placement rights along roads and/or pathways. Information related to the location of utility structures may be disjoint since these utility structures may be owned by different utility companies, may have been installed at different times, or may be used for different purposes. Images of these utility structures may be processed to determine the utility structures in a geographical area without relying on disjoint information from utility companies and/or other incomplete or inaccurate databases.

Figure 1:
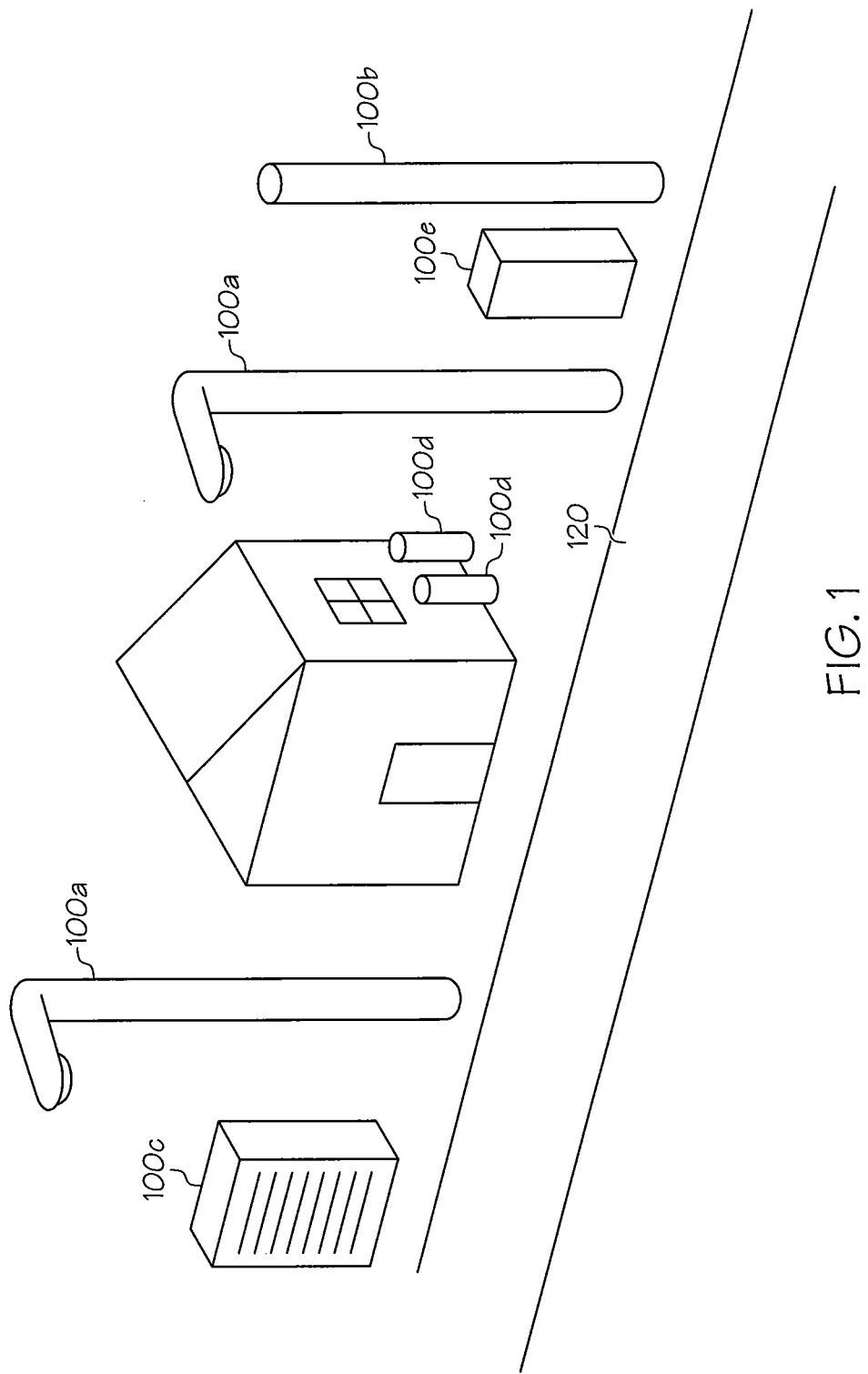
FIG. 1 illustrates various utility structures near a road in a neighborhood, according to various embodiments described herein.
Figure 2A:
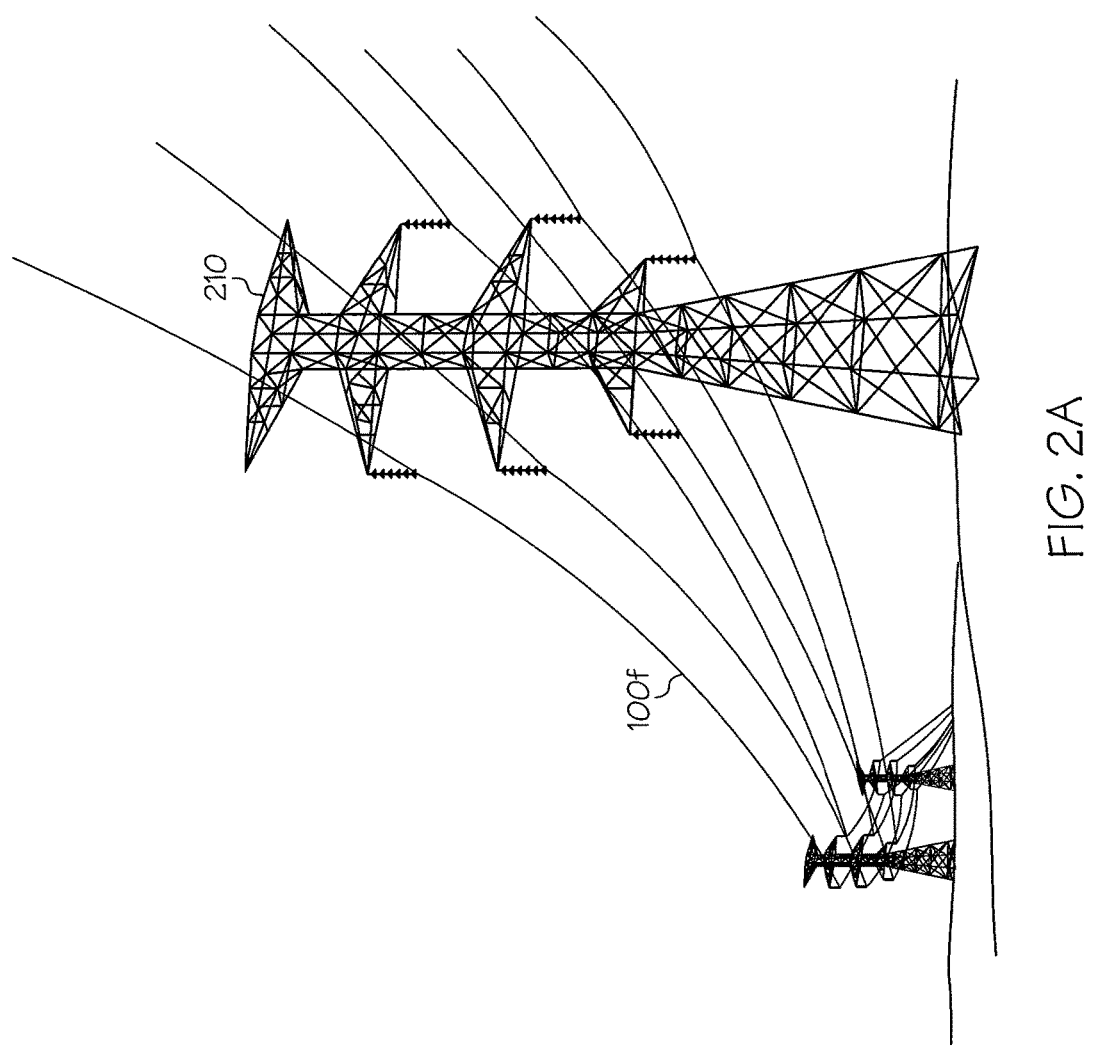
FIG. 2A illustrates towers with power lines between, according to various embodiments described herein.
Figure 2B:
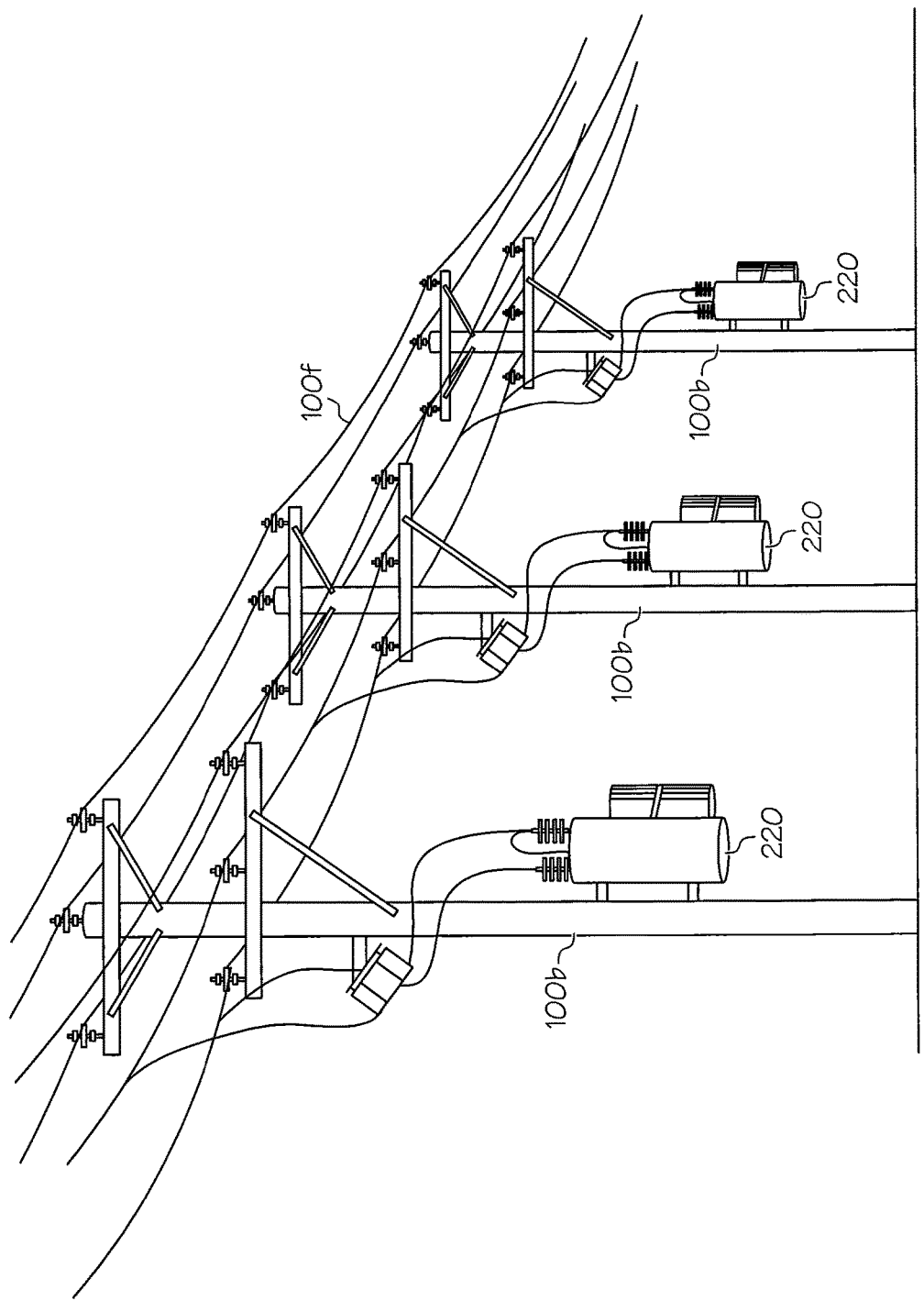
FIG. 2B illustrate distribution poles with power line between, according to various embodiments described herein.

FIG. 1 illustrates a neighborhood that has many utility structures along it. Referring now to FIG. 1, the road, sidewalk, and/or pathway 120 may be a residential street that runs alongside houses. Utility structures, such as a street light pole 100a, a distribution pole 100b, a power distribution box 100c, HVAC units 100d, and/or a telecommunications pedestal/junction box 100e, may be found along the pathway 120. As used herein, a utility structure may include utility lines such as power or telecommunication lines, telecommunication junction boxes, pedestals, generator boxes, HVAC units, or any mounting structure such as light poles, distribution poles, traffic signal poles, or sign poles. Referring now to FIG. 2A, towers 210 have power lines 100f running between them. Referring now to FIG. 2B, distribution poles 100b may have power lines 100f running between them. Distribution poles 100b may have various utility elements such as transformers 220 that are mounted on them. Towers 210 and/or distribution poles 100b may be near a pathway such as a road, or may be in an easement where trees have been removed.

Figure 3:
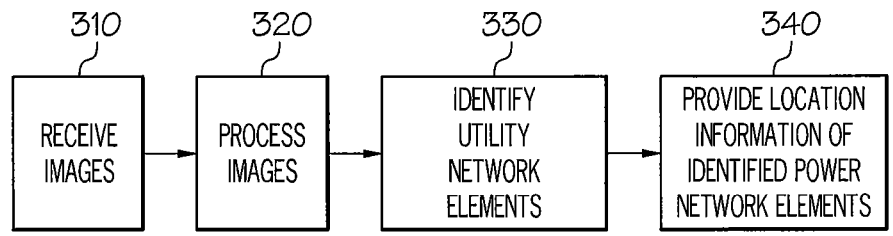
FIG. 3 is a flowchart of operations for identifying utility network elements, according to various embodiments described herein.

FIG. 3 is a flowchart of operations for identifying utility structures, such as those illustrated in FIG. 1, FIG. 2A, and/or FIG. 2B. Referring now to FIG. 3, images may be received, at block 310. These received images may be processed using various image processing techniques, at block 320. Based on the image processing, utility network elements and/or utility structures such as 100a through 100f of FIG. 1, FIG. 2A, and/or FIG. 2B may be identified, at block 330. Location information related to the identified utility network elements may be provided, at block 340.

Figure 4:
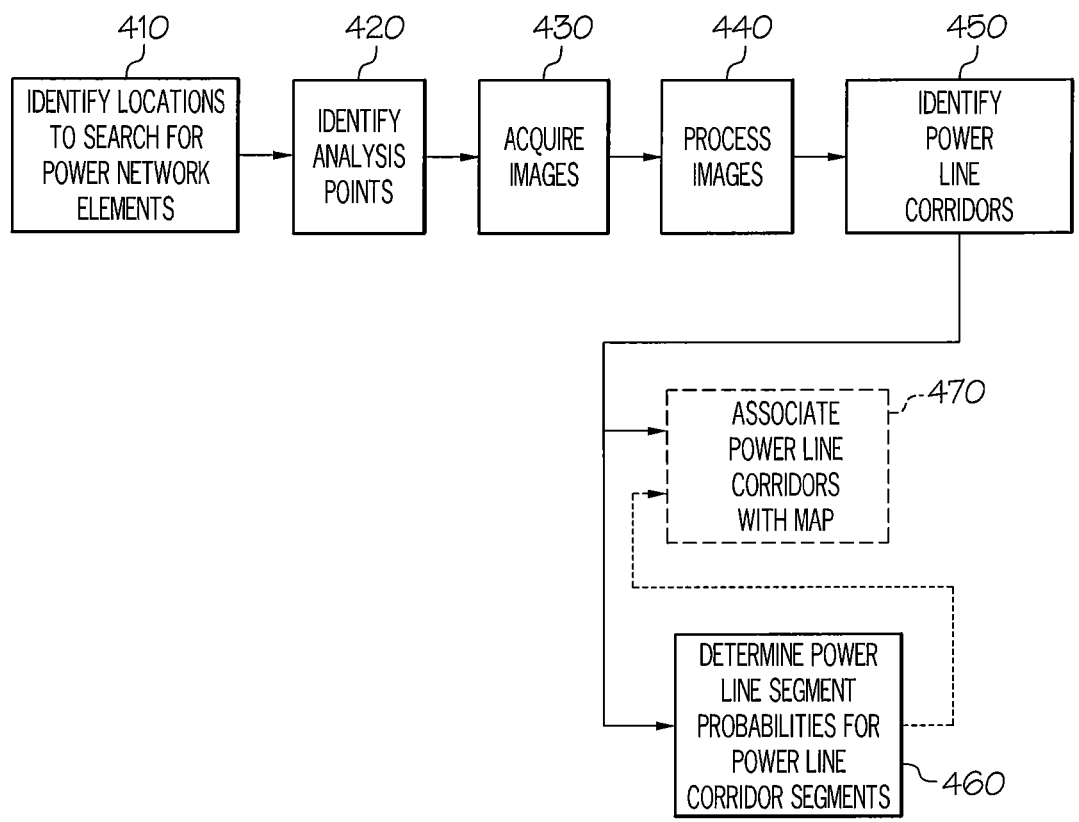
FIG. 4 is a flowchart of operations for identifying a utility line corridor, according to various embodiments described herein.

FIG. 4 is a flowchart of operations for determining utility line corridors such as power line corridors. Referring now to FIG. 4, geographical locations to search for power network elements may be identified, at block 410. Analysis points that may be used for finding and identifying power network elements in the geographical area are identified, at block 420. Images related to these identified analysis points are acquired, at block 430. These images are processed in order to identify utility elements, at block 440. Based on the image processing, power line segments may be identified at block 450. Probabilities associated with each of the power line segments may be determined and subsequently used to extrapolate power line corridors, at block 460. In some embodiments, based on the probability of occurrence of various power line segments, the power line corridors may be associated with a geographical map, at block 470.

Figure 5A:
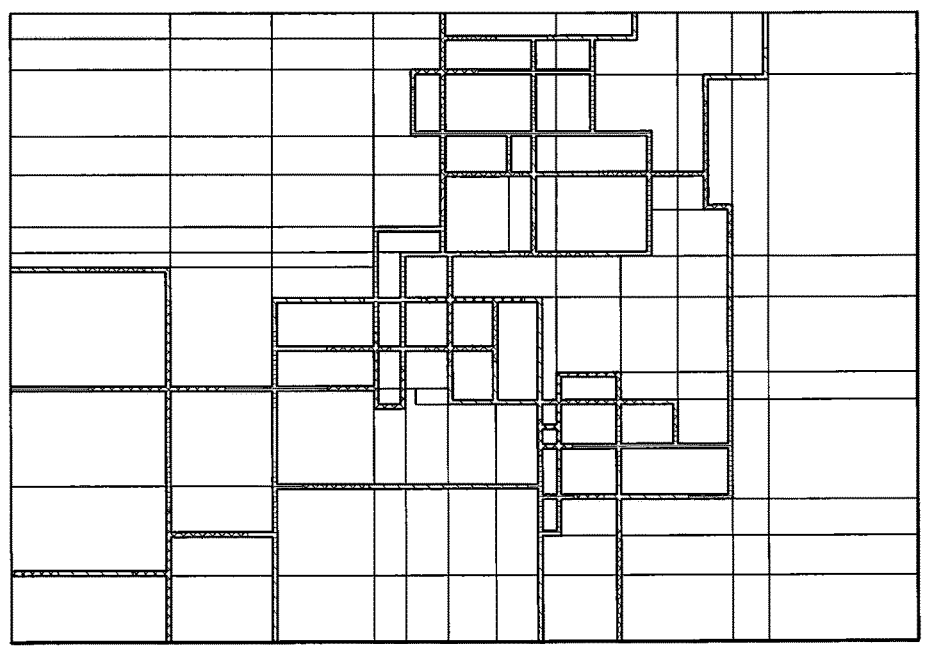
FIGS. 5A to 5C illustrate maps that include utility infrastructure information, according to various embodiments described herein.
Figure 5B:
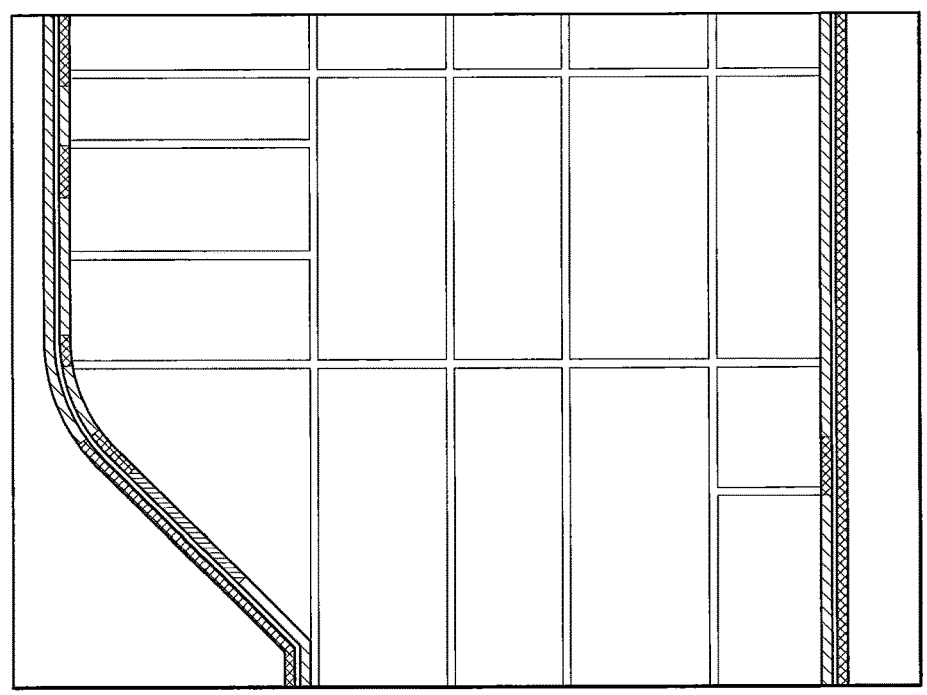
Figure 5C:

Examples of geographical maps that include power line distribution corridors are illustrated in FIGS. 5A to 5C. Referring now to FIG. 5A, a map of a geographical area is illustrated. The map includes power line corridors that have been determined as described according to various embodiments herein. Referring now to FIG. 5B, a map at the accuracy level of blocks within the city is illustrated. This city block level map illustrates power line corridors that have been determined according to various embodiments described herein. The maps of FIG. 5A and/or FIG. 5B may include information depicting low-probability corridors, mid-probability, and/or high-probability corridors. FIG. 5C illustrates a map that includes utility structures that have been identified according to various embodiments described herein. For example, a map may indicate identified distribution poles, transmission towers, and/or streetlights.

Figure 6:
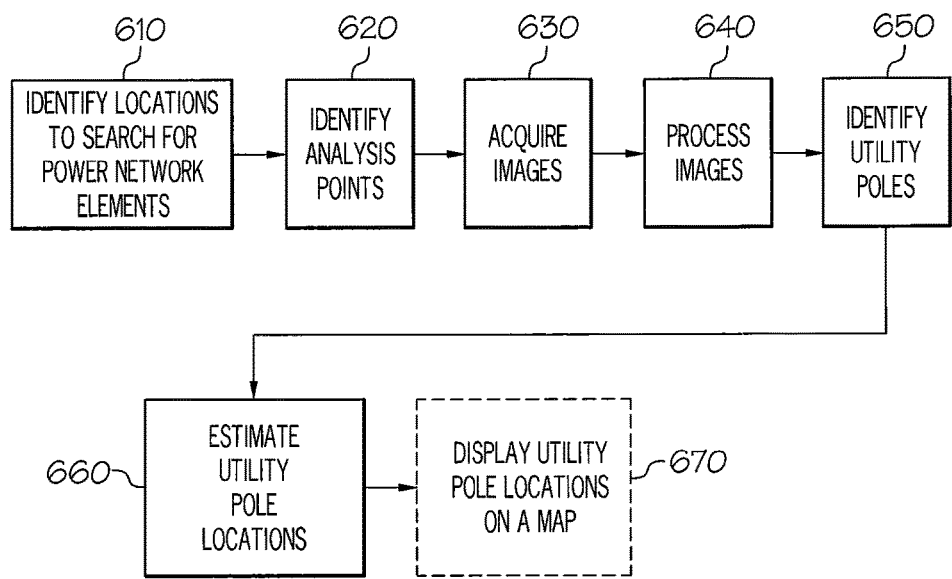
FIG. 6 is a flowchart of operations for identifying utility poles, according to various embodiments described herein.

FIG. 6 is a flowchart of operations to determine locations of utility poles, according to various embodiments. Referring now to FIG. 6, geographical locations to search for utility poles are identified, at block 610. Analysis points that are needed for finding and identifying utility poles in the geographical area are identified, at block 620. Images related to these identified analysis points are acquired, at block 630. These images are processed using various image processing techniques to identify utility poles, at block 640. Based on the image processing, utility poles are identified, at block 650. The locations of these utility poles are estimated, at block 660. These utility pole locations may be displayed on a map such as the map of FIG. 5C, at block 670.

Figure 7A:
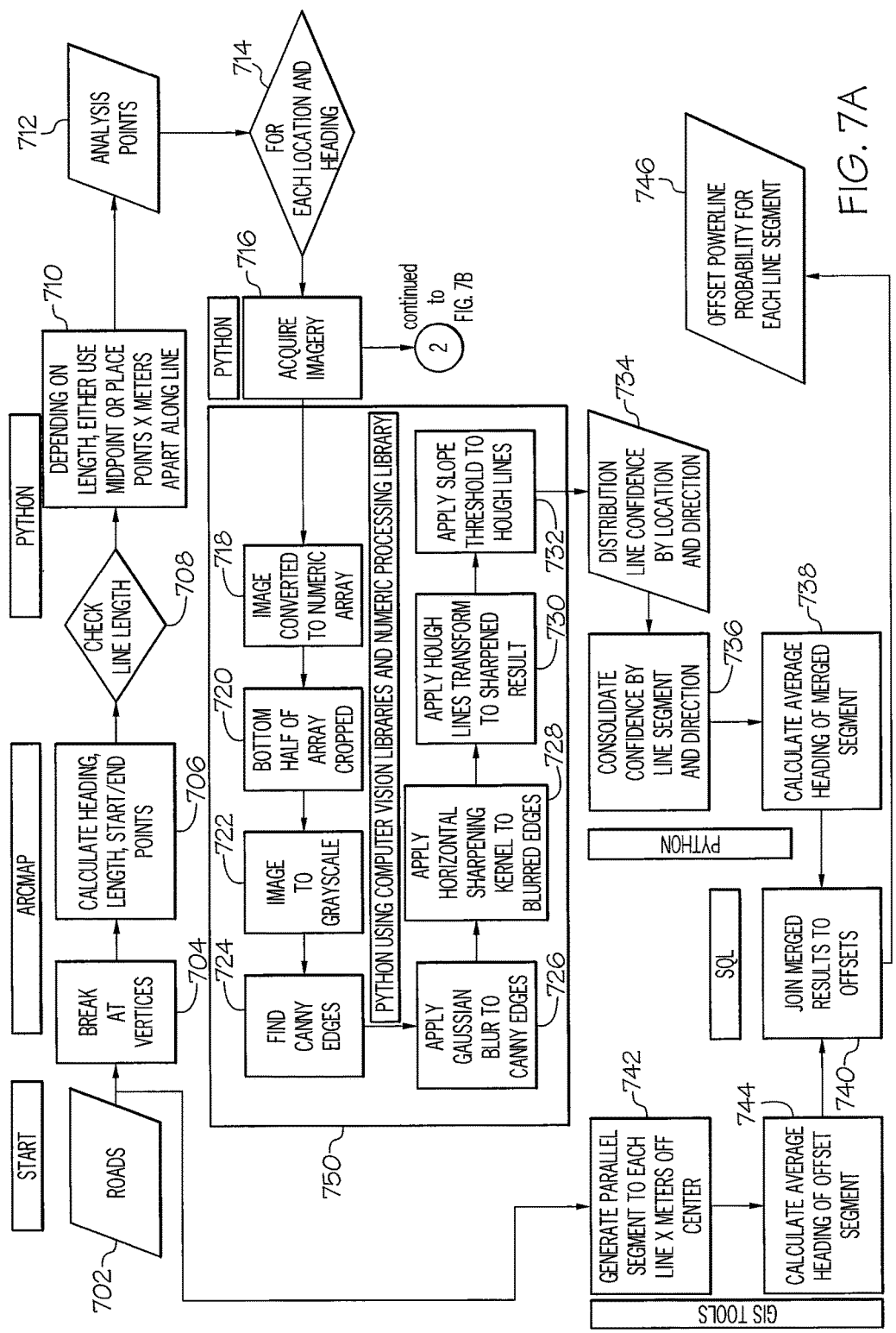
FIGS. 7A and/or 7B is a flowchart of operations for identifying utility structures, according to various embodiments described herein.

FIG. 7A is a flowchart of operations for identifying utility structures, according to various embodiments described herein. Referring now to FIG. 7A, roads, sidewalks, or other pathways are identified as having utility easements nearby, at block 702. Geographic locations that may be analyzed for potential existence of utility structures are identified using the operations of blocks 704 to 710, which may correspond to block 410 of FIG. 4 and/or block 610 of FIG. 6. For example, major roads or roads near a high concentration of businesses or residences may be selected for analysis. The pathways of block 704 may be sectioned into smaller segments by breaking pathways at vertices to arrive at straight line segment representations. This breaking of the pathways at vertices associated with the pathway may be accomplished using Geographic Information System (GIS) tools to create maps, perform spatial analysis, and manage GIS information, such as ArcMap®, R, and/or SQL. GIS data may be sourced from geographic information databases that include road data, such as, for example, from Environmental Systems Research Institute (ESRI). Characteristics of these roadway data that has been broken into straight line segments may be further analyzed to determine start points and/or end points, heading, and/or the length, at block 706. The line length may be compared to a threshold line length, at block 708. Referring now to block 710 of FIG. 7A, if the line length is less than the threshold line length, a midpoint of the pathway segment may be used to determine images that will be analyzed. If the line length is greater than the threshold line length, then the pathway segment may be further segmented, such that additional segmentation points are placed at some distances apart along the pathway segment. In some embodiments, implementation of the threshold comparison of block 708 and/or the pathway segmentation of block 710 may be accomplished using a Python script.

Based on the midpoint location and/or additional segmentation points, analysis points related to images needed for analysis may be determined, at block 712, which may correspond to block 420 of FIG. 4 and/or block 620 of FIG. 6. The analysis points and/or image requirements may be specified in terms of location and/or direction or heading. In some embodiments, a table of these image requirements may be collected. The analysis points, which may include location and/or heading information, may be sent to an image repository such as Google® Images, at block 714. Images of the street view or other view of the pathway, as specified by the analysis points of block 712 may be acquired at block 716, which may correspond to block 430 of FIG. 4 and/or block 630 of FIG. 6. In some embodiments, implementation of the interfaces to acquire the imagery may be accomplished using a Python script. Various image processing techniques may be applied to the acquired images at block 750, which may correspond to block 440 of FIG. 4 for the case of identifying utility lines. Non-limiting example image processing techniques, that may be implemented with Python scripts using Computer Vision libraries such as Open CV and/or Numeric Processing Libraries such as Numpy will now be discussed.

Still referring to FIG. 7A, the acquired imagery may be represented as pixels and may include color information, such as Red, Green, Blue (RGB) information. An image may be converted to a numeric array, at block 718. In a case where utility lines are expected to be found in the image, the bottom half of the image may be cropped to reduce the computational complexity associated with the image processing, based on the assumption that utility lines are usually found high above the ground, at block 720. The image may be converted to a grayscale image to facilitate processing, at block 722. A grayscale image is based on the value of each pixel being a single sample representing an amount of light. Each pixel in a grayscale image may carry intensity information and may be composed exclusively of shades of gray, varying from black at the weakest intensity to white at the strongest intensity. Grayscale images may also be referred to as black-and-white images or monochrome images. Grayscale images may improve the ability to identify utility lines and distinguish the utility lines from the surrounding objects in the image. The utility lines may be isolated as either dark on a bright background or bright on a dark background. In some embodiments, based on the angle of the sun at image capture, a bright reflection against a backdrop of dark trees may be identified. The grayscale images may be processed to find Canny edges, at block 724. Canny edge detection is an edge detection operator that uses multi-stage processing to detect and/or identify a wide range of edges in images. A Gaussian Blur may be applied to the Canny edges, at block 726. The Gaussian Blur may make the pixel noise blurrier in order to remove other artifacts in the image such as, for example, tree branches. In other words, the artifacts in the image may be converted to noise and thus be insignificant in identifying the utility structures of interest.

Still referring to FIG. 7A, a horizontal sharpening kernel may be applied to the blurred edges, at block 728. The horizontal sharpening kernel may identify pixels around an image by passing a moving window across the image. For example, the image may be 800×800 pixels in size, but a window of pixels such as, for example, a window of 3×3 pixels or 5×5 pixels, may be used by the horizontal sharpening kernel to identify a utility line. The window of pixels used may correspond to an odd dimension of pixels to facilitate identifying the middle pixel. A Hough transform may be applied to sharpen the resulting image and/or to identify long lines such as utility lines, at block 730. The detected lines may be extended to extend across the image. The Hough transform is a feature extraction technique that is used in image analysis, computer vision, and digital image processing. The purpose of the Hough transform is to find imperfect instances of objects within a certain class of shapes by a voting procedure. This voting procedure may be carried out in a parameter space, from which object candidates are obtained as local maxima in a so-called accumulator space that is explicitly constructed by the algorithm for computing the Hough transform. In some embodiments, about 900 ranked permutations of the steps described herein may be applied to each image. A slope threshold may be applied to the detected Hough lines that result from the Hough transform, at block 732. The slope threshold may be used to remove lines in the image that are more vertical based on the assumption that utility lines usually are parallel to the ground and thus would likely not be vertically positioned in an image.

Still referring to FIG. 7A, the result of the image processing at block 750 may be output as a distribution with a line confidence associated with the location and/or direction/heading, at block 734. In other words, adjacent line segments in one or more images may be extrapolated to discern a utility line and/or a utility line corridor. A consolidated data set or merged results based on the statistical confidence associated with the location and/or direction/heading may be generated, at block 736. This output may be a series of geographical points and/or may be output on a map with the utility line and/or the utility line corridor depicted along a pathway.

In some embodiments, an average heading or other statistical characteristic of the consolidated data set or merged results may be determined, at block 738. This determination may include association with a pathway, such as information regarding which side of the pathway and/or road segments includes the utility line and/or a utility line corridor. The consolidated data set and/or the average heading may be determined, for example, using a Python script.

Still referring to FIG. 7A, the pathway or road information of block 702 may be used to generate parallel segments or offset segments to each pathway that are a distance off the center of the pathway, at block 742. These parallel segments may be used in some embodiments to overlay the results of blocks 734, 736, and/or 738 onto a road map. The parallel segments may be consolidated mathematically to determine an average heading or direction of the pathway for the parallel segments or offset segments, at block 744. Smaller parallel segments or offset segments may be combined into a single visual line that is offset from the pathway. The parallel segments or offset segments as well as the average heading of the consolidated data set or merged results may be joined, at block 740. The results may be matched or referenced back to the earlier image processing results to determine pathway segments. An offset utility line probability for utility lines and/or utility line corridors may be included in a display of results, at block 746. These probabilities may be indicated on the display of a road map using various ways such as colors or other markings, as discussed with respect to FIGS. 5A to 5C.

Figure 7B:
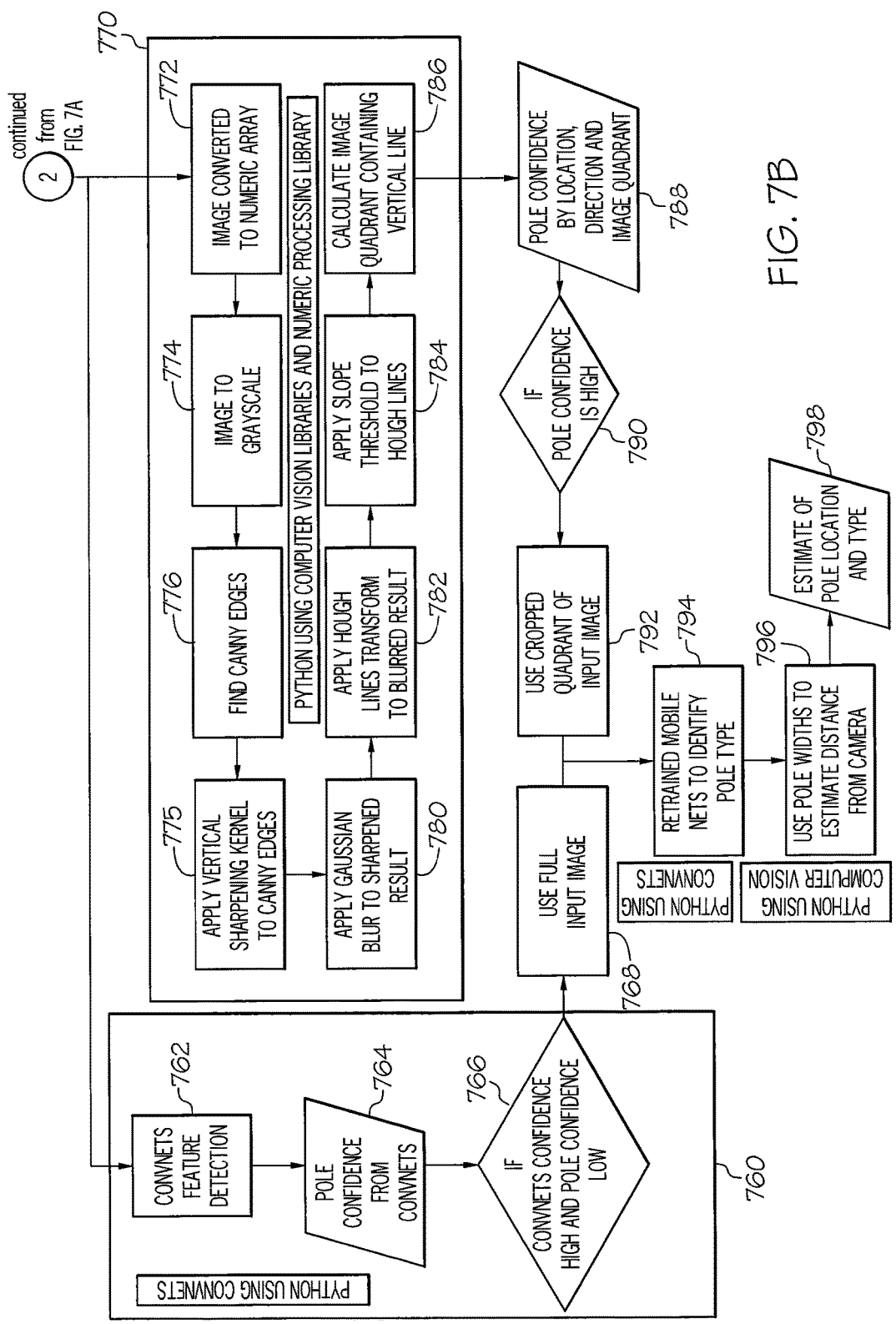

FIG. 7B is flowchart of operations for identifying utility structures, according to various embodiments described herein. FIG. 7B may be a continuation of the flowchart of FIG. 7A. Referring now to FIG. 7B, embodiments related to determining the location of utility poles will be discussed. Various image processing techniques may be applied to the acquired images at block 770, which may correspond to block 640 of FIG. 6 for the case of identifying utility poles. Non-limiting example image processing techniques, that may be implement with Python scripts using Computer Vision libraries such as Open CV and/or Numeric Processing libraries such as Numpy will now be discussed.

Still referring to FIG. 7B, the acquired imagery may be represented as pixels and may include color information, such as RGB information. An image may be converted to a numeric array, at block 772. The image may be converted to a grayscale image to facilitate processing, at block 774. The grayscale images may be processed to find Canny edges, at block 776. A vertical sharpening kernel may be applied to the Canny edges, at block 778. A Gaussian Blur may be applied to the vertically sharpened result, at block 780. A Hough transform may be applied to blurred result, at block 782. A slope threshold may be applied to the detected Hough lines that result from the Hough transform, at block 784. The slope threshold may be used to remove lines in the image that are more horizontal based on the assumption that utility poles usually are perpendicular to the ground and thus would likely not be horizontally positioned in an image. In some embodiments, an image quadrant including the vertical line may be determined, at block 786. The image quadrant may be based on dividing an image into quarter segments to aide in identifying poles. In some embodiments, about 7 ranked permutations of the steps described herein may be applied to each image.

The result of the image processing at block 770 may be output as a distribution with a confidence associated with the location and/or direction/heading of the utility pole, at block 788. In other words, one or more images may be extrapolated to discern the location of a utility pole. In some embodiments, it may be determined if the statistical confidence related to the location and/or direction of the utility pole is above a threshold value, at block 790. If the statistical confidence is above the threshold, a cropped quadrant of the input image may be used for estimating the utility pole location, at block 792.

In some embodiments, an image acquired at block 716 may be processed using neural network image detection, at block 760. Neural network image detection may be performed in addition to, or as an alternative to the image procession operations of block 770. Neural network image processing may include feature detection, at block 762. Feature detection may be performed using a variety of techniques to obtain a likelihood that an object such as a utility pole is in the image. An example of a feature detection approach is the use of Convolutional Neural Networks (CNN) detection products such as Google's open source code Inceptionv3®. The confidence of the existence of the utility pole in the image may be obtained from the feature detection software, such as Convolutional Neural Networks, at block 764. The statistical confidence of having a utility pole is compared to a threshold value, at block 766. If the statistical confidence of having a utility pole is below a threshold value, the full image may be used for the utility pole estimation, at block 768.

A cropped quadrant image from block 792 and/or a full image from 768 may be used to identify a utility pole type, at block 794. The utility pole type may distinguish between street light poles, utility distribution poles, traffic signal poles, and/or traffic sign poles. In some embodiments, more specific types of poles, such as types of light poles may be distinguished. The utility pole type may be identified based on Convolutional Neural Networks. These operations may be implemented, for example, using Python scripts using Convolutional Neural Network interfaces. Once the utility pole type is identified, a database may be used to determine the pole width for a given utility pole type. Based on the pole width, a distance from a camera that obtained the image of the utility pole may be estimated, at block 796. In other words, the foreground depth of the utility pole may be estimated. Based on this information, an estimate of the utility pole location and/or utility pole type may be provided, at block 798. In some embodiments, the estimated utility pole location and/or utility pole type may be provided on a map as illustrated, for example, in FIG. 5C. Locations of multiple utility poles in one or more images may be used to determine a corridor of utility poles.

Figure 8:
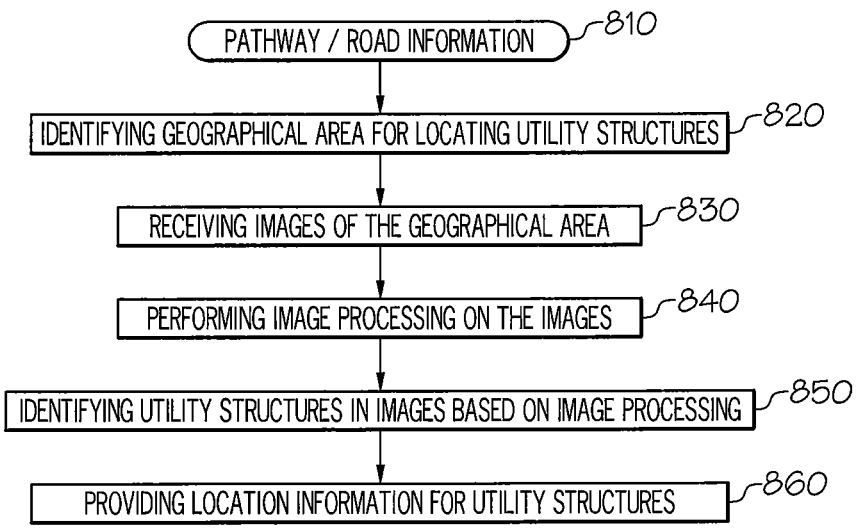

FIG. 8 is a flowchart of operations for identifying utility structures, according to various embodiments described herein. Referring now to FIG. 8, information regarding pathways and/or roads may be available, at block 810. A geographical area for locating utility structures may be identified, at block 820, which may correspond to any of the blocks 704 to 712 of FIG. 7B. Images of the geographical area may be received, at block 830, which may correspond to block 716 of FIG. 7B. Image processing techniques may be performed on the images that were received, at block 840, which may correspond to blocks 750, 760, and/or 770 of FIG. 7B. Utility structures in the images may be identified based on the image processing, at block 850, which may correspond to block 746 and/or block 798 of FIG. 7B. Location information associated with the utility structures that were identified may be provided, at block 860.

Figure 9:
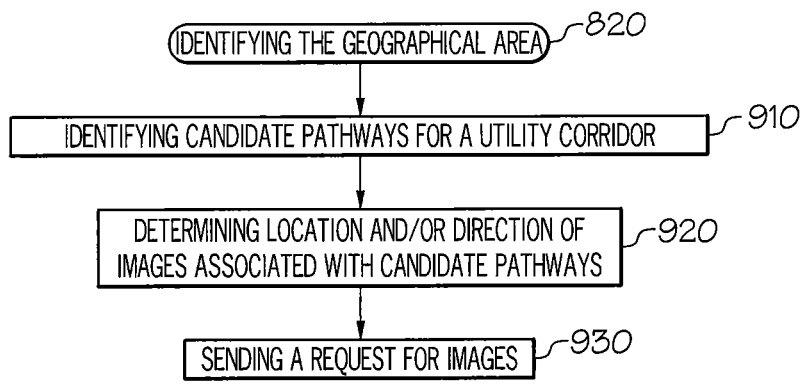

FIG. 9 is a flowchart of operations for identifying the geographical area, corresponding to block 820 of FIG. 8. Referring now to FIG. 9, candidate pathways for a utility corridor may be identified, at block 910. The location and/or direction of images associated with the candidate pathways may be determined, at block 920. A request for images associated with the candidate pathways may be sent, at block 930.

Figure 10:
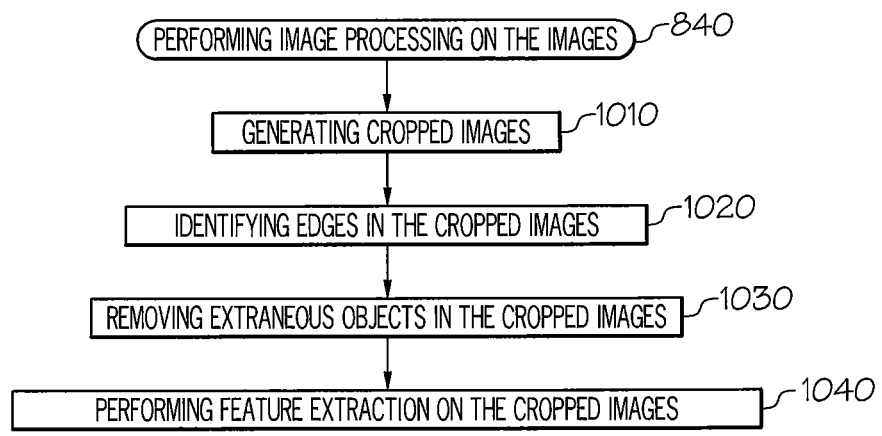

FIG. 10 is a flowchart of operations for performing image processing on the images, corresponding to block 840 of FIG. 8. Referring now to FIG. 10, cropped images may be generated at block 1010. Edges may be identified in the cropped images, at block 1020. This identification of the edges may correspond to finding the Canny edges as in block 724 of FIG. 7A or block 776 of FIG. 7B. Extraneous objects may be removed from the cropped images, at block 1030. Feature extraction may be performed on the cropped images, at block 1040.

Figure 11:
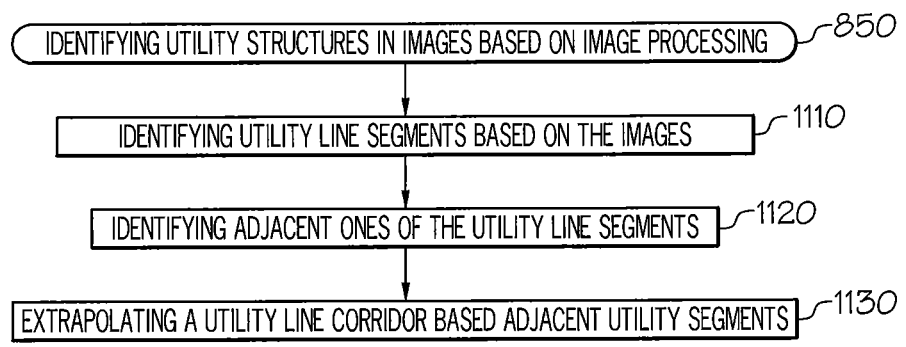

FIG. 11 is a flowchart of operations for identifying utility structures in images based on image processing, corresponding to block 850 of FIG. 8. Referring now to FIG. 11, utility line segments may be identified based on analysis of the images, at block 1110. Adjacent ones of the utility line segments may be identified, at block 1120. A utility line corridor may be extrapolated based on adjacent utility line segments, at block 1130.

FIGS. 12 and 13 are flowcharts of operations for identifying utility structures. Referring now to FIG. 12, utility line corridor may be associated with the pathway in a geographical area, at block 1210. Referring now to FIG. 13, a map of the geographical area indicating a pathway and an associated utility line corridor may be provided, at block 1310.

FIG. 14 is a flowchart of operations for performing image processing on an image, corresponding to block 840 of FIG. 8. Edges in the image may be identified, at block 1410, which may correspond to block 724 of FIG. 7A and/or block 776 of FIG. 7B. Extraneous objects in the image may be removed, at block 1420. Feature extraction may be performed to identify utility structures in the image, at block 1430.

FIG. 15 is a flowchart of operations for identifying the utility structures based on image processing, that may correspond to block 850 of FIG. 8. Referring now to FIG. 15, a utility pole may be identified based on one or more images, at block 1510.

Figure 16:
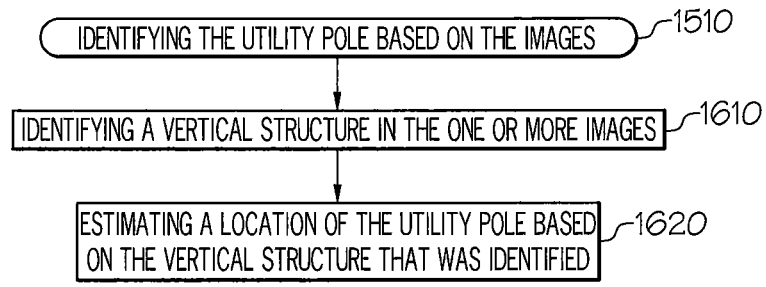

FIG. 16 is a flowchart of operations corresponding to identifying the utility pole based on an image at block 1510 of FIG. 15. Referring now to FIG. 16, a vertical structure may be identified in one or more of the images, at block 1610. A location of the utility pole may be estimated based on the vertical structure that was identified, at block 1620.

Figure 17:
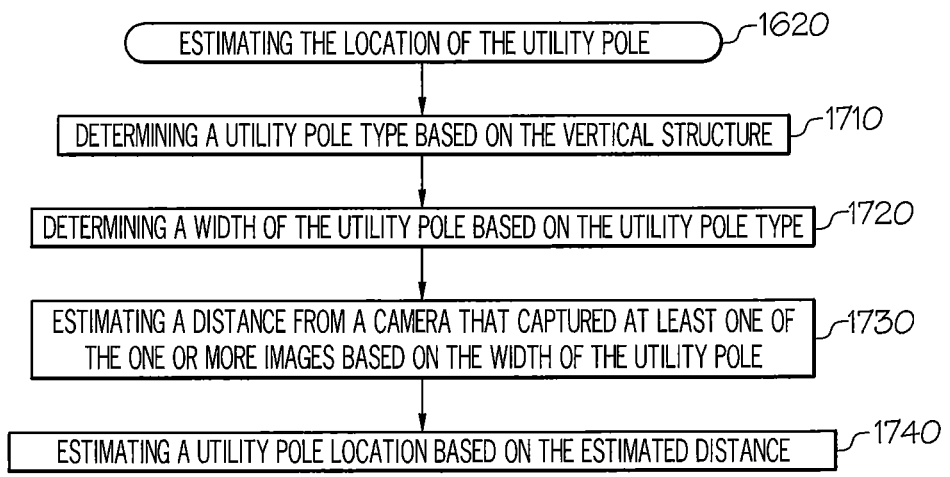

FIG. 17 is a flow chart of operations corresponding to estimating the location of the utility pole, at block 1620 of FIG. 16. Referring now to FIG. 17 a utility pole type may be determined based on the vertical structure, at block 1710. A width of the utility pole may be determined based on the utility pole height, and blocks 1720. A distance from a camera that captured at least one of the images may be estimated based on the width of the utility pole, at block 1730. A utility pole location may be estimated based on the estimated distance, at block 1740.

Figure 18:

FIG. 18 is a flowchart of further operations that may be performed to identify utility structures. Referring now to FIG. 18, a map indicating a geographical location of the utility pole that was identified may be provided, at block 1810.

FIG. 19 is a flowchart of operations for identifying a plurality of utility poles. Referring now to FIG. 19, utility structures may be identified, at block 1910. Adjacent ones of the plurality of utility poles may be identified, at block 1920. A utility pole corridor may be extrapolated based on the determination of adjacent utility poles, at block 1930.

FIG. 20 and FIG. 21 are flowcharts of operations for identifying utility structures, according to some embodiments described herein. Referring now to FIG. 20, a utility pole corridor may be associated with a pathway in a geographical area, at block 2010. Referring now to FIG. 21, a map including the pathway in the utility pole corridor that is associated with the pathway may be provided, at block 2110.

FIG. 22 is a flowchart of operations corresponding to the performing image processing on the images of block 840 of FIG. 8. Referring now to FIG. 22, neural network image detection may be performed based on likelihood estimation of objects in one or more images, at block 2210. These neural network image detection operations may correspond to blocks 760, 762, 764, and/or 766 of FIG. 7B.

Figure 23:
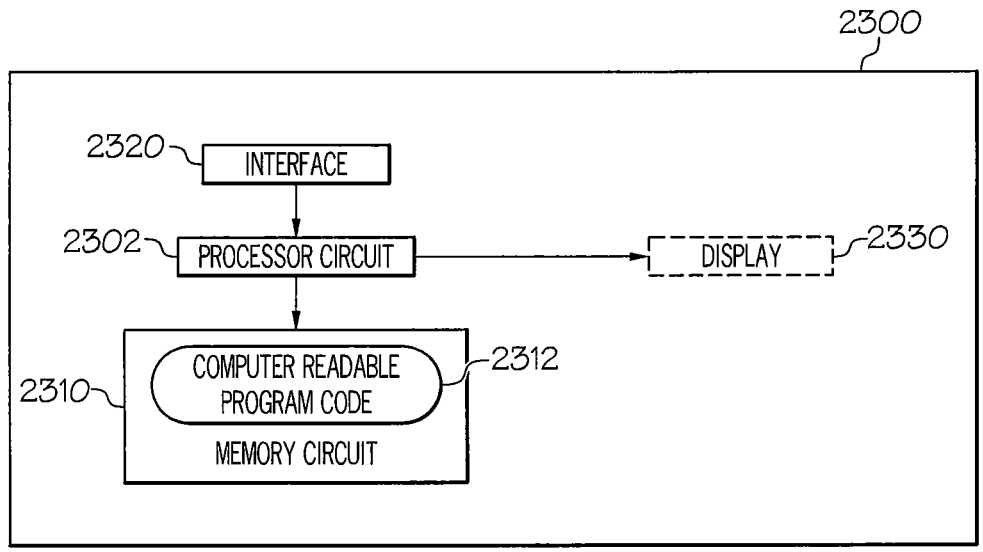
FIGS. 23 and 24 are block diagrams of devices for identifying utility structures, according to various embodiments described herein.

FIG. 23 is a block diagram of a node 2300 of a communication network. The node 2300 may be integrated with a computer system that may be associated with a utility processing system. The node is configured to perform operations according to one or more embodiments disclosed herein. Referring to FIG. 23, the node 2300 includes a display circuit 2330, a processor circuit 2302, and a memory circuit 2310 containing computer readable program code 2312. The processor circuit 2302 may include one or more data processing circuits, such as a general purpose and/or special purpose processor, e.g., microprocessor and/or digital signal processor, that may be collocated or distributed across one or more networks. The processor circuit 2302 is configured to execute the computer readable program code 2312 in the memory 2310 to perform at least some of the operations and methods of described herein as being performed by the node 2300. The interface 2320 is coupled to the processor circuit 2302 and may communicate with a server or other external network entity, directly or indirectly.

Figure 24:
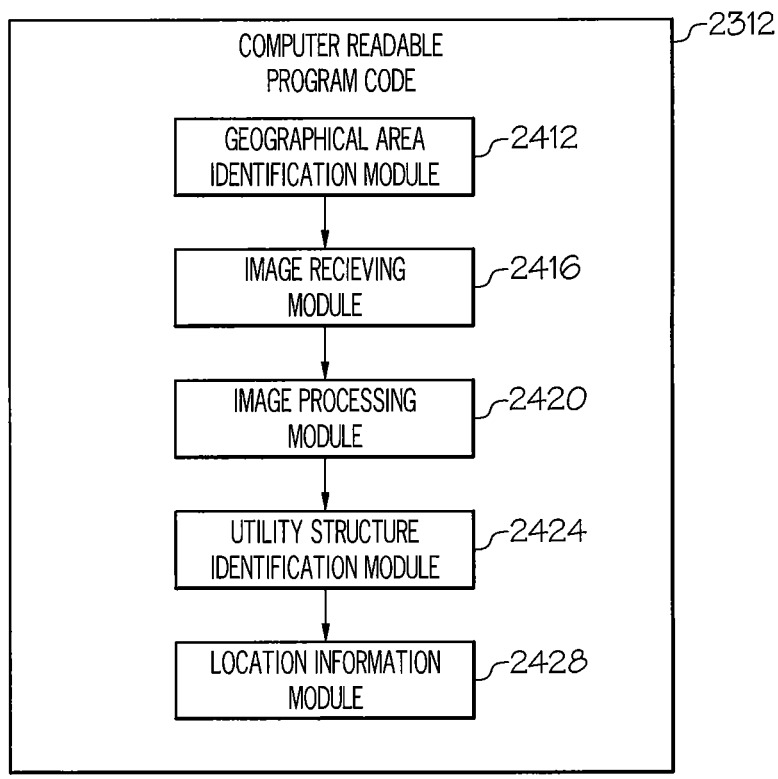

FIG. 24 illustrates modules for a node that perform operations as disclosed herein according to some embodiments. The computer readable program code 2312 of FIG. 23 may include one or more modules. Referring now to FIG. 24, the computer readable program code 2312 may include a geographical area identification module 2412, an image receiving module 2416, an image processing module 2420, a utility structure identification module 2424, and a location information module 2428. The geographical area identification module 2412 is for identifying a geographical area for locating the utility structures (block 820 of FIG. 8). The image receiving module 2416 is for receiving images of the geographical area that was identified (block 830 of FIG. 8). The image processing module 2420 is for performing image processing on the images that were received (block 840 of FIG. 8). The utility structure identification module 2424 is for identifying the utility structures based on the image processing (block 850 of FIG. 8). The location information module 2428 is for providing location information associated with the utility structures that were identified (block 860 of FIG. 8). The modules 2412, 2416, 2420, 2424, and 2428 may perform other corresponding operations and methods disclosed herein.

Various embodiments presented herein have described methods for identifying utility structures from images. Identification of utility structures from images may be used to identify utility poles, utility line, and/or utility corridors. The techniques for identifying utility structures and determination of utility easements may provide advantages for easily obtaining this information even if different utility databases are disjoint or contain incomplete information.

FURTHER DEFINITIONS

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art, and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-eRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module" or variants thereof.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination. Many variations and modifications can be made to the embodiments without substantially departing from the principles described herein. All such variations and modifications are intended to be included herein within the scope.

The invention claimed is:

1. A method for identifying utility structures, the method comprising:
    identifying a geographical area for locating the utility structures;
    receiving images of the geographical area that was identified;
    performing image processing on the images that were received;
    identifying utility line segments based on the images that were image processed;
    identifying two or more adjacent utility line segments of the utility line segments that were identified;
    extrapolating a utility line corridor based on the two or more adjacent utility line segments; and
    providing location information associated with the utility structures that were identified.

2. The method of claim 1, wherein the identifying the geographical area comprises:
    identifying one or more pathways that are candidate pathways for a utility corridor;
    determining a respective location and/or a respective direction of respective ones of the images that are associated with the candidate pathways; and
    sending a request for the images of the geographical area comprising the respective location and/or the respective direction of respective ones of the images that are associated with the candidate pathways.

3. The method of claim 1, wherein the performing image processing on the images that were received comprises:
    generating cropped images based on cropping one or more of the images to include portions likely to include utility structures;
    identifying edges in the cropped images;
    removing extraneous objects in the cropped images; and
    performing feature extraction on the cropped images to determine extracted images.

4. The method of claim 1, further comprising:
    associating the utility line corridor with a pathway in the geographical area.

5. The method of claim 4, further comprising:
    providing a map comprising at least the geographical area,
    wherein the map indicates the pathway and the utility line corridor that is associated with the pathway.

6. The method of claim 1, wherein the performing image processing on the images that were received comprises:
    identifying edges in the images;
    removing extraneous objects in the images; and
    performing feature extraction to identify utility structures in the images.

7. The method of claim 1, wherein the performing image processing on the images that were received comprises:
    identifying a utility pole based on one or more of the images.

8. The method of claim 7, wherein the identifying the utility pole based on one or more of the images comprises:
    identifying a vertical structure in the one or more images; and
    estimating a location of the utility pole based on the vertical structure that was identified.

9. The method of claim 8, wherein the estimating the location of the utility pole comprises:
    determining a utility pole type based on the vertical structure;
    determining a width of the utility pole based on the utility pole type;
    estimating a distance from a camera that captured at least one of the one or more images based on the width of the utility pole; and
    estimating a utility pole location based on the distance that was estimated.

10. The method of claim 9, further comprising:
providing a map comprising at least the geographical area,
wherein the map indicates a geographical location of the utility pole.

11. The method of claim 7, wherein the utility pole comprises a first utility pole, the method further comprising:
identifying a plurality of utility poles comprising the first utility pole based on the one or more images;
identifying adjacent ones of the plurality of utility poles; and
extrapolating a utility pole corridor based on two or more of the adjacent ones of the utility plurality of utility poles.

12. The method of claim 11, further comprising:
associating the utility pole corridor with a pathway in the geographical area.

13. The method of claim 12, further comprising:
providing a map comprising at least the geographical area,
wherein the map indicates the pathway and the utility pole corridor that is associated with the pathway.

14. The method of claim 1, wherein the performing image processing on the images that were received comprises:
performing neural network image detection based on likelihood estimation of objects in one or more of the images.

15. A computer program product, comprising:
a tangible, non-transitory computer readable storage medium comprising computer readable program code embodied in the medium that when executed by a processor causes the processor to perform operations comprising:
identifying a geographical area for locating the utility structures;
receiving images of the geographical area that was identified;
performing image processing on the images that were received;
identifying the utility structures comprising a utility pole based on one or more of the images
identifying a vertical structure in the one or more images;
estimating a location of the utility pole based on the vertical structure that was identified;
determining a utility pole type based on the vertical structure;
determining a width of the utility pole based on the utility pole type;
estimating a distance from a camera that captured at least one of the one or more images based on the width of the utility pole;
estimating a utility pole location based on the distance that was estimated; and
providing the utility pole location that was estimated.

16. A node in a communication network, the node comprising:
a memory configured to store computer executable instructions; and
a processor coupled to the memory, wherein the processor is configured to execute the computer executable instructions to perform operations comprising:
identifying a geographical area for locating the utility structures;
receiving images of the geographical area that was identified;
performing image processing on the images that were received;
identifying the utility structures comprising a plurality of utility poles based on one or more of the images there were image processed;
identifying two or more adjacent utility poles of the plurality of utility poles; and
extrapolating a utility pole corridor based on the two or more adjacent utility poles; and
providing location information associated with the utility pole corridor.

* * * * *